(12) United States Patent
Dixon et al.

(10) Patent No.: US 6,487,345 B1
(45) Date of Patent: Nov. 26, 2002

(54) COMMUNICATION CABLE HAVING REDUCED JACKET SHRINKAGE

(75) Inventors: Lisa A. Dixon, Atlanta; Richard D. Small, Lilburn; Phillip M. Thomas, Suwanee; Peter A. Weimann, Atlanta, all of GA (US)

(73) Assignee: Fitel USA Corp., Norcross, GA (US)

( * ) Notice: Subject to any disclaimer, the term of this patent is extended or adjusted under 35 U.S.C. 154(b) by 24 days.

(21) Appl. No.: 09/697,339

(22) Filed: Oct. 26, 2000

Related U.S. Application Data

(63) Continuation-in-part of application No. 09/481,186, filed on Jan. 12, 2000, now Pat. No. 6,324,324.

(51) Int. Cl.[7] .................................................. G02B 6/44
(52) U.S. Cl. ...................................................... 385/100
(58) Field of Search ................................... 385/100–114

(56) References Cited

U.S. PATENT DOCUMENTS

| | | | |
|---|---|---|---|
| 4,078,853 A | 3/1978 | Kempf et al. | 350/96.23 |
| 4,730,894 A | 3/1988 | Arroyo | 350/96.33 |
| 4,765,712 A | 8/1988 | Bohannon, Jr. et al. | 350/96.23 |
| 4,826,278 A | 5/1989 | Gartside, III et al. | 350/96.23 |
| 4,844,575 A | 7/1989 | Kinard et al. | 350/96.23 |
| 5,082,348 A | 1/1992 | Gartside, III et al. | 385/111 |
| 5,109,457 A | 4/1992 | Panuska et al. | 385/102 |
| 5,125,063 A | 6/1992 | Panuska et al. | 385/113 |
| 5,574,816 A | 11/1996 | Yang et al. | 385/109 |
| 5,838,864 A | 11/1998 | Patel et al. | 385/113 |
| RE36,157 E * | 3/1999 | Robbins et al. | 156/244.11 |

* cited by examiner

Primary Examiner—Hung N. Ngo
(74) Attorney, Agent, or Firm—Thomas, Kayden, Horstemeyer & Risley, LLP

(57) ABSTRACT

A jacket for a communication cable is made from a resin that has high aspect ratio filler materials, and possibly coupling agents, dispersed therein. The fillers and the coupling agents reduce the post-extrusion shrinkage of the jacketing compound such that the strength members used in the communication cable need have only negligible compressive stiffness. The communication cable may further include a skin coating surrounding the outer jacket.

29 Claims, 2 Drawing Sheets

COMMUNICATION CABLE HAVING REDUCED JACKET SHRINKAGE

CROSS-REFERENCE TO RELATED APPLICATION

This application is a continuation-in-part of U.S. utility application entitled "Communication Cable Having Reduced Jacket Shrinkage," having Ser. No. 09/481,186, filed Jan. 12, 2000, now U.S. Pat. No. 6,324,324, which is entirely incorporated herein by reference.

TECHNICAL FIELD

The present invention is generally related to a communication cable and, more particularly, is related to the outer jacket of such cables.

BACKGROUND OF THE INVENTION

Optical fiber cables have been used for many years to transmit information at high rates and very long distances. The transmission media of the optical fiber cable are hair-thin optical fibers protected from external forces and elements by precisely designed and manufactured cable structures. There are several relatively common cable structure families currently being used to protect these hair-thin optical fibers. Such cable structure families include the loose tube, the slotted core and the central core structures.

Optical fibers are relatively delicate compared to previous types of communication media. Typically made of glass, the fibers are not ductile and therefore can be broken or cracked, which can destroy or degrade the signal being transmitted. Therefore, optical fibers are housed in rugged cable structures to protect the fibers from mechanical damage caused by heavy loads, sharp impacts or gnawing rodents. The quality of a signal transmitted through an optical fiber is also sensitive to tensile stress. Accordingly, tensile stiffness members are included in each type of optical fiber cable structure to carry the majority of tensile loads.

Plastic jacketing materials are extruded as the final layer of fiber optic cables in a continuous, high-speed sheathing operation. This layer is applied directly over the layers of components used to carry tensile loads and to shield the optical fibers from the environment. Once added, the jacketing plastic couples to the components in contact with it. Several types of strength members are used in cables, both metallic and dielectric.

Heretofore, strength systems used in optical cables have had two primary functions: 1) to carry tensile loads; and 2) to restrict the contraction and expansion of the jacketing plastic. Tensile loads are applied to the cable during installation, e.g., while being pulled into ground conduits, or during service life, e.g., while suspended between telephone poles. Environmental temperature variations during product life can cause the jacketing plastic to expand and contract applying tensile and axial compressive loads on the strength systems. However, a more significant instance of contraction by the jacketing plastic occurs during manufacture of the cable. Current jacketing materials, including high-density polyethylene and medium-density polyethylene, exhibit sufficient post-extrusion shrinkage during cooling as to apply compressive axial loads on any adjacent components e.g., strength members extending axially along the cable. To resist these compressive and the other tensile loads, rigid strength rods, made from steel, epoxy/glass, epoxy/aramid, etc., have been embedded in cable jackets.

In general, metallic components, including wires and armoring tapes, have excellent tensile properties and sufficiently high compressive stiffness so as not to strain significantly under the axial compressive load exerted by the cooling jacket. Alternately, dielectric materials, such as aramid and glass fibers, which provide excellent tensile characteristics, provide little axial compressive resistance in their simplest, and therefore lowest cost, forms, e.g., yarns. Because these yarns cannot resist compressive loads, the shrinking jacket buckles these dielectric tensile members as it cools. Then, when the final cable is loaded in tension, the tensile yarns will not support any tensile load until the cable has been elongated to the point where the yarns are straightened. This process leaves the optical fibers vulnerable to tensile loading until the yarns pick up the tensile load. As a result, current dielectric strength members are generally constructed as rigid composite rods made of high modulus and high strength fibers, such as glass or aramids, embedded in a hard epoxy matrix. However, these rigid dielectric rods can be very costly, and they, along with the metal wires, make the cable less flexible because their added compressive stiffness leads to higher flexural stiffness.

In illustration of this prior art, U.S. Pat. No. 5,131,064 to Arroyo, et al., discloses a cable having strength rods and a lightning-protective sheath system comprising a thermal barrier, which are disposed between the core of the cable and its plastic jacket. The thermal barrier comprises a textile of glass yarns that have been woven into a unit and then sandwiched between a pair of tapes together with a water-blocking material such as a superabsorbent powder. The glass yarns undulate in the longitudinal direction, not only because of their weaving pattern, but also because the tape follows the undulations of a corrugated metallic shield. Such undulations preclude the tape from receiving any portion of the load until the cable has already been elongated. And since the disclosed tape has a very low tensile strength, 420 Newtons per centimeter of width, the cable's tensile strength effectively comes from rigid strength rods that are embedded in the plastic jacket. However, these rods are less flexible than the woven tape, thereby reducing the flexibility of the entire cable. Further, if a pair of rods are used and are positioned diametrically opposite each other on either side of the core, they make the cable inflexible in all but one plane and much more difficult to handle and install.

Another example is U.S. Pat. No. 4,730,894 to Arroyo, which discloses an optical fiber cable that includes a plurality of equally spaced strength members disposed on a carrier tape and held in place by an adhesive. Once a plastic jacket is extruded onto the strength members, they are coupled to the jacket and provide tensile strength to the cable. However, if the strength members are flexible, i.e., they have essentially no compressive strength or stiffness, then they will shrink in the longitudinal direction after the plastic jacket cools and will not be able to receive any portion of the tensile load until the jacket is elongated. This is undesirable because excessive cable elongation can cause the tensile load to be transferred to the optical fibers. On the other hand, as noted previously, increased compressive stiffness correlates to increased flexural stiffness and, therefore, decreased cable flexibility, which makes cables more difficult to handle and to install. However, to protect the valuable optical fibers, cable flexibility generally has been sacrificed in the prior art.

Yet another example of prior art, U.S. Pat. No. 5,838,864 to Patel, discloses a cable with a dielectric strength member system that attempts to maximize the flexibility of the cable by using a flexible woven strength tape to carry to majority of the tensile loads. To control post-extrusion shrinkage, two rigid epoxy-fiber rods are embedded in the jacket, diametrically opposite one another, on either side of the core. However, as these rods do not have to carry tensile load, their size is minimized and, therefore, the overall cost of the strength system is reduced. Further, the volume of jacket material required to encase the smaller strength rods is less than for larger rods, further reducing the cost of the overall cable sheath. Still, the strength system is more expensive and complex than is desirable because of the need for two types of strength systems.

Another approach to preventing jacket shrinkage and buckled strength members from making the optical fibers vulnerable to tensile loads is to control the length of the optical fibers relative to that of the sheath components. Fibers can be protected during the elongation of the sheath if they also are not straight when the cable starts to stretch. Accordingly, most fiber optic cables contain excess fiber length relative to the final length of the cable sheath. However, there is a limit as to the amount of excess fiber length that can reasonably be introduced into a cable core without making the cable diameter prohibitively large or inducing optical signal loss by introducing excessive bends or undulations along a length of fiber. Unfortunately, the contraction of standard cable jacket materials can buckle the simple dielectric strength members as much as 1.5%, while acceptable amounts of excess fiber length may be less than 0.5%.

Therefore, since excess fiber length alone cannot be used to compensate for jacket shrinkage, the common default solution to this problem is to use the rigid dielectric strength rods to resist jacket shrinkage. As stated previously, unlike the metallic strength members, these dielectric rods are very costly, even when compared to their base component yarns and filaments, and rigid enough to reduce cable flexibility.

Therefore, there appears to be a fundamental conflict in providing an easy-handling, cost-effective dielectric cable sheath and a dielectric sheath that adequately protects the optical fibers. Known designs for best protecting the optical fibers make the cable more expensive, stiff, and difficult to handle. Known designs for making the cable flexible either require that the glass fibers have more excess length than is desirable, or expose the glass fibers to tensile loading and possible breakage.

However, if the jacket material had minimal post-extrusion shrinkage, i.e., less than the excess length of the optical fibers, the more costly dielectric strength components would not be required. Accordingly, what is sought is a jacket material with minimal post-extrusion shrinkage that still meets the demands of ruggedness and flexibility for use in outdoor communication cables.

Heretofore, some prior art cables have incorporated nucleating agents, e.g., inorganic materials, salts of aliphatic monobasic or dibasic acids, or alkali metal or aluminum salts of aromatic or alicyclic carboxylic acids, and filler materials, e.g., talc, glass fiber, and glass spheres, into buffer or core tubes to give the desired properties of high strength, low shrinkage, good flexibility, improved processibility and low cost. An example of such a prior art cable is described in U.S. Pat. No. 5,574,816, (the '816 patent) issued to Yang, et al. Because the fillers or nucleating agents of the '816 patent were only added to the core or buffer tubes, the cables of that design still required tensile stiffness members with sufficient compressive stiffness to resist jacket shrinkage. As mentioned hereinbefore, it would be desirable to eliminate the need for the costly dielectric strength members. Furthermore, the '816 patent only added the fillers to a polyethylene-polypropylene copolymer resin and does not address the use of fillers that can be added to other types of resin.

Thus, a heretofore unaddressed need exists in the industry to address the aforementioned deficiencies and inadequacies.

SUMMARY OF THE INVENTION

The foregoing problems have been overcome by a communication cable including a jacket made of a resin and high aspect ratio fillers and, if needed, coupling agents added to the resin. The high aspect ratio fillers occupy a predetermined volume of the jacket so as to control post extrusion shrinkage. Adequate reduction in shrinkage can be achieved with embodiments of the invention including average filler particle sizes ranging from $5 \times 10^{-6}$ to $1 \times 10^{-2}$ meters, and aspect ratios ranging from approximately 10 to 3500.

Possible examples of the type of resins that may be incorporated into the jacket are polyethylenes, ethylene-vinyl acetate copolymers, copolymers of polypropylene and ethylene/propylene rubber, and ethylene-ethyl acrylate copolymers. The fillers may be either fibrous, platelike, or organic in nature. Possible examples of coupling agents, which can help bond the fillers to the resin, are organofunctional silanes, titanates, zirconates, epoxy coating, amphiphilic amines and functionalized polyolefins.

Further, the communication cable may include a skin coating of polyethylene (PE) that surrounds the outer jacket. The PE skin coating provides, among other things, known weatherability and protection to the cable. Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
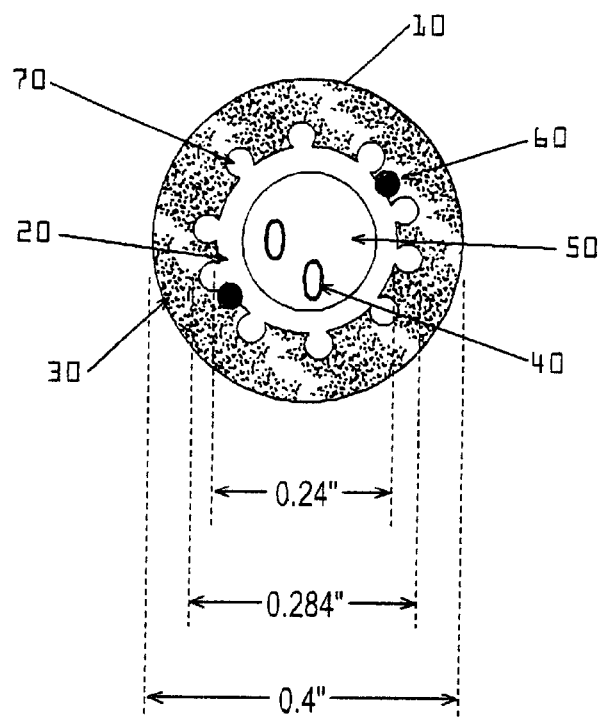
FIG. 1 is a cross-sectional end view of a standard dielectric cable design that can be used to measure post-extrusion jacket shrinkage.

FIG. 1 discloses a standard central-core dielectric cable 10 having a core tube 20 disposed within an outer jacket 30 comprising a resin, fillers, and a coupling agent. Disposed within core tube 20 are transmission media 40 and, optionally, a filling compound 50. A rip cord 60, e.g., Kevlar yarn, facilitates removal of the outer jacket 30. Additionally, strength members 70 are disclosed here as ten glass rovings, 0.022 inches×0.054 inches. The purpose of the strength members 70 is to provide tensile stiffness when an axial load is applied to the cable 10 and to keep this load from being transmitted to the transmission media 40 within the central core 20.

Desirably, the strength members 70 possess negligible compressive stiffness as these components are very flexible and can be as much as 70% less in cost than rigid dielectric strength members, such as epoxy-glass rods, which have significant compressive as well as tensile stiffness. The strength members 70 may be impregnated glass rovings; however, other materials, metallic or non-metallic, such as glass or Kevlar® yarn can be used. Also, the strength members 70 can be composite structures. These strength members are an integral part of the jacket 30 and function together as a unit.

The specific design of these strength members and the complete sheath system are not critical to the novel aspects of the present invention. However, for the sake of completeness, various forms of acceptable sheath designs and constructions are provided in the following commonly assigned U.S. Pat. No. 4,078,853 to Kempf, et al.; U.S. Pat. No. 4,826,278 to Gartside, et al.; U.S. Pat. No. 4,844,575 to Kinard, et al.; U.S. Pat. No. 5,082,348 to Gartside, et al.; and U.S. Pat. No. 5,109,457 to Panuska et al., all of which are incorporated herein by reference.

As stated above with regard to the sheath system, the particular design and construction of the sheath is not critical to the implementation of the present invention. Nevertheless, one acceptable jacket design is an outer jacket 30 that comprises a resin and high aspect ratio fillers occupying a predetermined volume of the jacket. Additionally, the outer jacket 30 may comprise a coupling agent to aid adhesion between the filler and the resin, to aid in dispersion of the filler, and to improve processibility. Further, an additional layer of polyethylene material may surround the cable jacket.

The coupling agents in the resin can either be added directly to the resin along with the fillers, or they can be first used to coat the fillers, before addition of the fillers to the resin of the jacket. Coupling agents may include organo-functional silanes, titanates, or zirconates, as well as functionalized amines. Other suitable coupling agents include epoxy coatings, available commercially from Baycomp Thermoplastic Composites, Inc., and functionalized polyolefins. Reported functional polyolefins include halogenated paraffins, carboxyl-modified polypropylenes, and maleated polypropylene. Halogenated compounds are known in the art and are described in *Polymer Composites*, v. 3, p. 231, by J. P. Trotignon, et al., 1982. The information regarding halogenated paraffins in this publication is hereby incorporated by reference. Carboxyl-modified polypropylenes are known in the art and are described in *Polymer Engineering and Science*, v. 15, p. 308, by K. Okuno and R. T. Woodhams, 1975. The information in this publication regarding polypropylenes is herein incorporated by reference. Maleated polypropylene is also known in the art and described in *Polymer Composites*, v. 5, p. 250, by I. Chun and R. T. Woodhams, 1984. The information in this publication relating to maleated polypropylene is herein incorporated by reference.

Any type of high aspect ratio mineral or synthetic filler should be workable in the present invention, including fibrous or needle-like fillers, platelike fillers, and organic fillers. Examples of fibrous fillers are wollastonite, glass fiber, milled glass, chopped glass, and chopped carbon fiber. Examples of platelike fillers are mica, talc, glass flake, silica, and clays such as montmorillonite, hectorite, bentonite, kaolinite, attapulgite, and vermiculite. For fibrous or needle-like fillers, the aspect ratio is taken from the fiber's length to its diameter. Thus, the equation describing aspect ratio is $a=L/D$, where $a$ is aspect ratio, $L$ is fiber length, and $D$ is fiber diameter. For platelike fillers, the aspect ratio may be defined as $a=D/t$, where $a$ is aspect ratio, $D$ is particle diameter, and $t$ is particle thickness, measured for a group of particles. If the particle is modeled as an ellipse, the diameter may be calculated as the average of the major and minor axes of the ellipse. This mode of calculating aspect ratio is known in the art and is described in *Polymer Engineering and Science*, v. 23, p. 766, by C. Busigin, G. M. Martinez, R. T. Woodhams and R. Lahtinen, 1983. Typically, aspect ratio of a particular sample is measured by optical microscopy and subsequent image analysis. The aspect ratio of individual members of a population is calculated by applying the above definitions to data for diameter, length, and thickness, and an average of these values is reported.

Fibrous fillers provide improved shear strain distribution when compared to platelike fillers, and thus yield better elongation when the cable is subjected to bending, when compared to equivalently loaded and coupled filler samples. Platelike fillers, for a given loading, are typically not as effective at controlling the shrinkage of the outer jacket upon extrusion. Fibrous fillers, in order to be effective in controlling shrinkage must also have good compressive properties, including resistance to buckling.

Very high aspect ratio fillers limit the elongation at break of the jacket. An acceptable jacket must have sufficient elongation to accommodate axial loading and bending-induced strains. For a one-dimensional analysis, strain=$\Delta L/L$ for axial loading. For bending-induced strains, Strain=(radial offset)/(bend radius).

To maintain the other desirable qualities of jacket 30, such as high elongation at break and cutability, volumes ranging from 1.5 to 25% of fillers are used. Assuming a perfect composite, i.e., "perfect" coupling between the resin and the fillers, theoretical calculations indicate that the optimal aspect ratio for the fillers is 100:1 for fibrous fillers and 25 to 30:1 for platelike fillers. In reality, the degree of coupling between the fillers and the resin is less than perfect, and the fillers may slip relative to the resin when the composite is strained. As a result, the aforementioned coupling agent is needed. Typically, glass fibers are treated with silane and carbon fibers with an epoxy sizing. The mica and talc particles may or may not be coated with a coupling agent. Clays are typically coated with an organophilic functionalized amine or similar molecule, e.g., octadecyl amine. Longer particle length, i.e., higher aspect ratios, can compensate somewhat for a poor bond between the filler and the resin.

Any high aspect ratio filler/coupling agent/resin combination may be feasible. Resin/filler combinations with reduced shrinkage are listed in Table 1.

TABLE 1

Lower Shrinkage Jacket Compounds

| Filler Type | Filler Size | Bulk Resin | Volume Fractions of Filler (%) | % Shrinkage of Jacket |
|---|---|---|---|---|
| Glass Fibers | Length: <10 mm L/D: <3500 | MDPE LLDPE, Polypropylene | 2.3 to 8.3 | 0.1–0.3 |
| Carbon Fibers | L = 1.5 to 10 mm, L/D: 200 to 1500 | MDPE | 1.5 to 5 | 0.02–.7 |
| Mica | L: ~35–70 × $10^{-6}$ m L/D: 25 to 70 | HDPE, MDPE | 5 to 8 | 1.0–1.3 |
| Talc | L: ~1 to 4 × $10^{-6}$ m L/D: 17–25 | HDPE, MDPE | 5 to 7 | 1.3–1.4 |

TABLE 1-continued

Lower Shrinkage Jacket Compounds

| Filler Type | Filler Size | Bulk Resin | Volume Fractions of Filler (%) | % Shrinkage of Jacket |
|---|---|---|---|---|
| Wollastonite | $L = 5 \times 10^{-6}$ m<br>L/D: 10–30 | HDPE, MDPE, LLDPE, Polypropylene, EVA copolymer | 7 to 25 | 0.025–0.7 |
| Wollastonite/ Milled Glass | For milled glass:<br>L: $150 \times 10^{-6}$ m<br>L/D: ~15 | LLDPE, Polypropylene | 10 to 35 | 0.08–0.5 |

A variety of base resins may be used in the present invention. Very effective resins appear to include linear low-density polyethylene (LLDPE), ethylene-vinyl acetate copolymer (EVA), and impact-modified isotactic polypropylene, which is typically a copolymer of polypropylene and ethylene/propylene rubber. However, high-density polyethylene (HDPE), medium-density polypropylene (MDPE), low-density polypropylene (LDPE), and ethylene-ethyl acrylate (E-EA) copolymers can all function as appropriate base resins for the jacket 30.

Jacket 30 can also be made from polybutylene terephthalate (PBT), polycarbonate (PC), a layered combination of PBT and PC, or a polyamide such as Nylon-12. The PBT, PC or Nylon are good materials for making buffer or core tubes because they are materials that have high Young's modulus and low thermal expansion coefficients. However, such materials also have some disadvantages when compared to other materials such as polyethylene or polypropylene-polyethylene copolymers. These disadvantages include higher cost, lower flexibility, moisture sensitivity, and increased difficulty in handling and processing due to the mechanical properties of the materials.

It is noted that the strength members 70 are coupled to the cable jacket such that when a tensile force is applied to the jacket, the force is transferred to the strength members after minimal elongation of the cable. However, this will only happen when the flexible strands 70 are substantially straight, i.e., they have a limited amount of excess length. If the strength members are applied such that they undulate in the longitudinal direction, then the length of the cable will have to increase significantly before the strength members will pick up the load. In the meantime, the tensile force applied to the optical fibers may exceed their safe limit. And while optical fibers may rival the strength of steel for a given cross-section area, they have very small cross sections and are not ductile. It is important that the flexible strength members 70 be substantially straight so that the optical fibers will not be strained excessively at the cable's rated tensile load. In other words, the percent excess length of the flexible strands ($\epsilon_s$) should be small enough to prevent the fiber from reaching its maximum allowable strain at the cable's rated tensile load.

Figure 2:
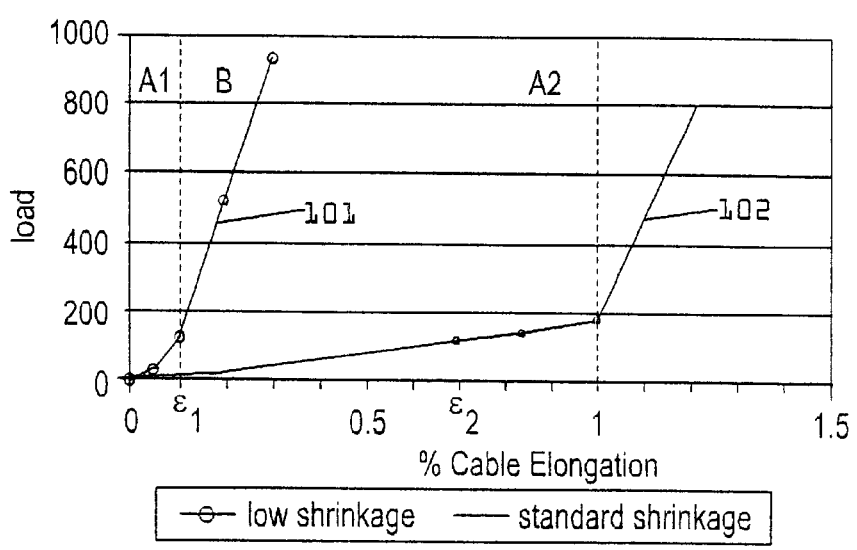
FIG. 2 is a graph of Tensile Load versus Cable Elongation for both a low shrinkage jacket and a standard jacketing material.

FIG. 2 is a graph showing cable elongation, i.e., strain, as a function of the tensile force, i.e., load, applied to the cable for two different cables. The loads demonstrated in FIG. 2 are those that are expected during the standard service life of a cable. Curve 102 illustrates the situation wherein the standard plastic jacket is used and shrinks due to cooling after being extruded onto a cable structure similar to the one illustrated in FIG. 1. Because the strength members 70 have little or no compressive stiffness, and because they are coupled to the jacket, the strength members 70 buckle as the jacket shrinks. Thereafter, when a tensile load is applied to the cable, the strength members 70 are not available to resist the load until they straighten out. Such a situation is undesirable because the amount of excess fiber length ($\epsilon_f$) needed to avoid excessive tensile loading is such that fiber-bending losses will occur.

Curve 101 graphically illustrates the present invention in terms of two different regions of cable operation. Region (A1) shows a rapid increase in cable elongation after a tensile load is first applied and the small undulations in the strength members 70 are straightening out; whereas region (B) shows a slow increase in cable elongation once the strength members 70 are handling the majority of the tensile load. The cable rapidly elongates in region (A1) because strength members 70 have been buckled due to shrinkage of the cable's plastic jacket and are returning to their unbuckled configuration as the tensile load is applied. The contribution of the low shrinkage jacket can be appreciated by comparing region (A1) of curve 101 with the corresponding region (A2) of curve 102 where standard jacketing material was used. The difference in cable elongation ($\epsilon_2-\epsilon_1$) as between curves 101 and 102, at a particular tensile load, is attributable to the fact that the jacket material shrinks less during cooling by that amount. Advantageously, this reduces the required amount of excess fiber by a like amount. In the preferred embodiment of the present invention, less than 1.0% excess fiber length is used.

As noted previously, an additional layer of polyethylene material filled with carbon black may surround the cable jacket. The advantage of this additional layer of polyethylene is that while lifetime durability of the cable jacket with the resin containing the filler may be unknown, a thin layer of polyethylene will provide known protection against potential environmental damage such as ultraviolet radiation, heat and gnawing insects, such as termites. Carbon black stabilizes the plastic against degradation by ultraviolet light by absorbing incident light and releasing the energy as harmless heat. The efficacy of carbon black stabilization has been reviewed in *Polymer Engineering and Science*, v. 9, p. 286, by J. B. Howard and H. M. Gilroy, 1969. In a preferred embodiment, the polyethylene is either MDPE or HDPE filled with 2.6 weight percent carbon black. HDPE is slightly harder and has a lower coefficient of friction than MDPE.

Figure 3:
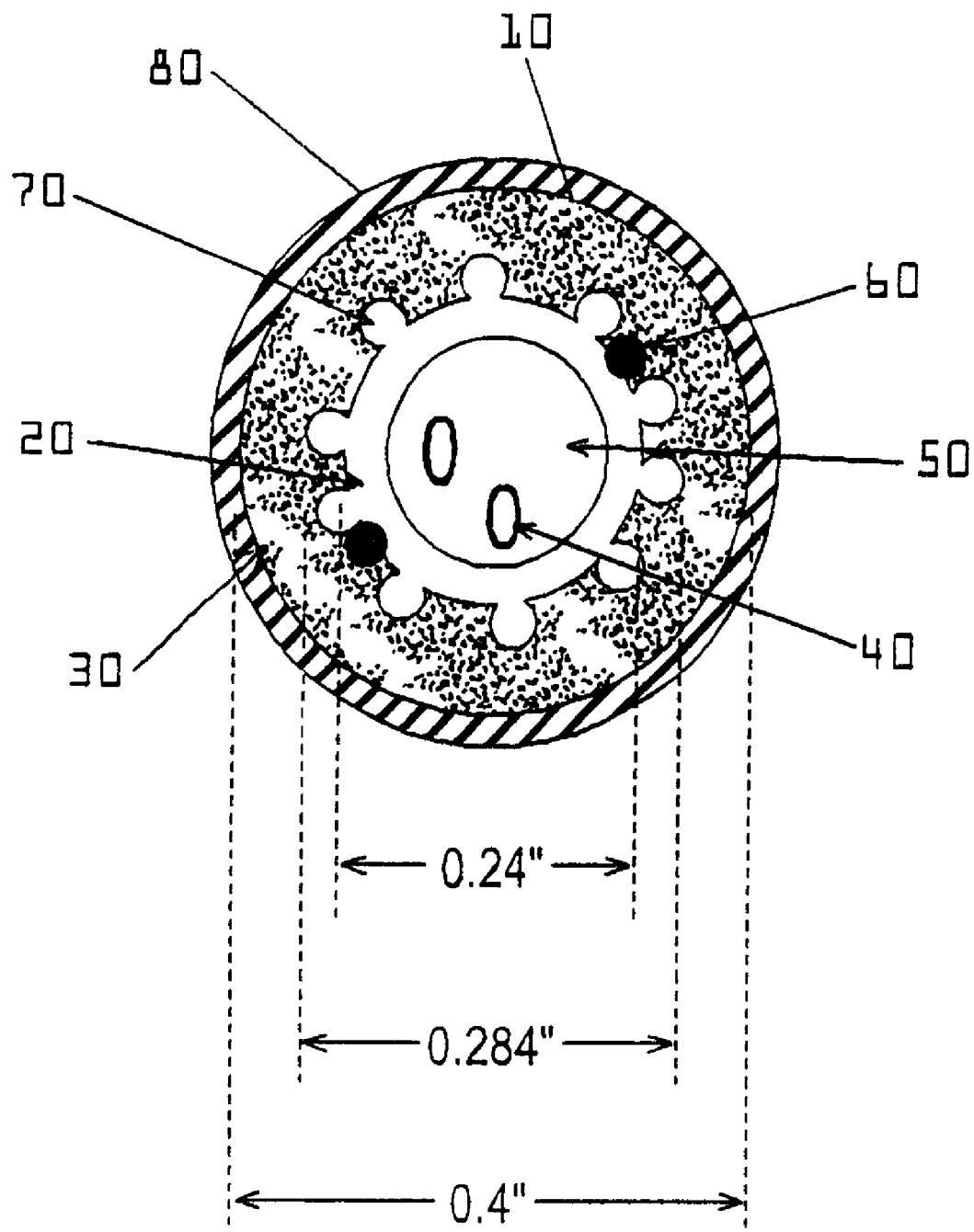

FIG. 3 depicts the table of FIG. 2 with the additional polyethylene jacket, or "skin coat" 80 in one embodiment. The preferred embodiment of the additional PE layer is one in which the skin coat is contained in the filled polymer and it "blooms" to the surface of the jacket during the extrusion process. In an alternate embodiment, the core tube 20 and the jacket 30, including the fillers, are fabricated by co-extrusion or sequential extrusion, with the strength members 70 between the core tube 20 and the outer jacket 30. Subsequently, after cooling of the jacket 30 the "skin coat" of PE 80 may be applied by either extrusion or hot melt coating, using a crosshead die. In this embodiment, the core tube 20 may be constructed out of PE or impact-modified polypropylene (PP).

Another embodiment of the skin coating is to eliminate the core tube 20 and make the jacket 30 function as the core tube. In this embodiment, the strength members 70 may be imbedded within the outer jacket 30. The "three layer" construction of the core tube 20, outer jacket 30, and skin coating 80 may be the easiest to manufacture. A "two layer"

construction however in which the outer jacket 30 serves as the core tube 20 may reduce cost. In this embodiment, the strength members 70 must be imbedded within the jacket 30.

For the skin coating 80, there is a minimum desired thickness of 0.001 inches (0.025 mm), based on the minimal thickness of carbon black-filled material needed to protect any sub-surface jacket 30 from UV degradation due to weathering in outdoor conditions. This minimal skin thickness is calculated based on Section 6.4.1 of the Telcordia GR-20 Standard, Generic Requirements for Optical Fiber and Optical Fiber Cable, using the UV absorption test method detailed in the ASTM D 3349 standard test. A thickness greater than 0.001 inches would most likely be used for ease and reliability of manufacture, as well as providing better protection against incidental damage to the thin coating 80, e.g., a scratch.

For the outer jacket layer 30, jacket thickness would vary depending on other variables in the cable sheath design, i.e., strength member types, core tube materials, cable size, etc. For outside plant cables, Telcordia GR-20 (Section 6.4.2) and ANSI/ICEA S-87-640-1999, Standard for Optical Fiber Outside Plant Communications Cable, Section 5.4.5, both identify minimal jacket thicknesses for single jacketed cables, 0.039 inches (1.0 mm) and 0.036 inches (0.9 mm), respectively; for multiple jacketed cables, 0.032 inches (0.8 mm) and 0.031 inches (0.8 mm), respectively; and for coverage of embedded strength members 0.028 inches (0.7 mm) and 0.020 inches (0.5 mm), respectively. In addition to these minimal requirements, the outer jacket 30 thickness may also be increased to improve a cable sheath's kink and/or crush resistance. Further, in the case of the outer jacket 30 which includes the fillers covered by a skin coating 80 of an unfilled jacket resin, the thickness of the outer jacket layer 30 may be increased to counteract the shrinkage reintroduced with the addition of the unfilled material in the coating 80. Thus, the overall, reduced shrinkage characteristics of the jacketing layers would be maintained. The increase in the jacket 30 thickness would depend on the overall cable design and the thickness of the skin coating 80.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A fiber optic cable comprising:
   an outer jacket for the cable, wherein the jacket comprises a resin; and
      high aspect ratio fillers occupying a predetermined volume of the jacket, and being configured to control post extrusion shrinkage of the jacket.

2. A fiber optic cable comprising:
   an outer jacket for the cable, wherein the jacket comprises a resin;
      high aspect ratio fillers occupying a predetermined volume of the jacket so as to control post extrusion shrinkage; and
      a coupling agent to aid adhesion between the fillers and the resin and to aid dispersion of the fillers.

3. The cable of claim 2, wherein the coupling agent is mixed with the resin.

4. The cable of claim 3, wherein the coupling agent is selected from the group consisting of:
   organofunctional silanes, titanates, zirconates, epoxy coating, functionalized amines, and functionalized polyolefins.

5. The cable of claim 2, wherein the fillers are coated with the coupling agent.

6. The cable of claim 5, wherein the coupling agent is selected from the group consisting of:
   organofunctional silanes, titanates, zirconates, epoxy coating, functionalized amines and functionalized polyolefins.

7. The cable of claim 6, wherein the functionalized polyolefins are selected from the group consisting of:
   halogenated paraffins, carboxyl-modified polypropylenes, and maleated polypropylene.

8. A fiber optic cable comprising:
   an outer jacket for the cable, wherein the jacket comprises a resin, wherein the resin is selected from the group consisting of: polyethylenes, ethylene-vinyl acetate copolymers, impact-modified isotactic polypropylene, including copolymers of polypropylene and ethylene/propylene rubbers, and ethylene-ethyl acrylate copolymers; and
      high aspect ratio fillers occupying a predetermined volume of the jacket so as to control post extrusion shrinkage.

9. A fiber optic cable comprising:
   an outer jacket for the cable, wherein the jacket comprises a resin; and
      high aspect ratio fillers occupying a predetermined volume of the jacket so as to control post extrusion shrinkage, wherein the fillers are fibrous.

10. The cable of claim 9, wherein the fibrous fillers are selected from the group consisting of:
    wollastonite, glass fiber, milled glass, chopped glass and carbon filler.

11. The cable of claim 9, wherein the aspect ratio of the fibrous fillers is at least 10:1.

12. A fiber optic cable comprising:
    an outer jacket for the cable, wherein the jacket comprises a resin; and
       high aspect ratio fillers occupying a predetermined volume of the jacket so as to control post extrusion shrinkage, wherein the fillers are platelike.

13. The cable of claim 12, wherein the platelike fillers are selected from the group consisting of:
    mica, talc, glass flakes, silica, montmorillonite, hectorite, kaolinite, attapulgite, bentonite, synthetic clay, and other clays.

14. A fiber optic cable comprising:
    an outer jacket for the cable, wherein the jacket comprises a resin; and
       high aspect ratio fillers occupying a predetermined volume of the jacket so as to control post extrusion shrinkage, wherein the fillers are organic.

15. The cable of claim 14, wherein the organic fillers are selected from the group consisting of:
    cellulose, jute and pineapple fibers.

16. A fiber optic cable comprising:
    an outer jacket for the cable, wherein the jacket comprises a resin; and
       high aspect ratio fillers occupying a predetermined volume of the jacket so as to control post extrusion shrinkage, wherein the fillers reduce post-extrusion shrinkage of the jacket by an order of magnitude.

17. A fiber optic cable comprising:
    an outer jacket for the cable, wherein the jacket comprises a resin; and
       high aspect ratio fillers occupying a predetermined volume of the jacket so as to control post extrusion shrinkage, wherein the fillers occupy a volume in the jacket up to 25%.

18. A fiber optic cable comprising:

an outer jacket for the cable, wherein the jacket comprises a resin, and
   high aspect ratio fillers occupying a predetermined volume of the jacket so as to control post extrusion shrinkage; and
a protective skin coating over the outer jacket.

19. The cable of claim 18, wherein the skin coating is made of polyethylene filled with carbon black.

20. The cable of claim 19, wherein the polyethylene is high density polyethylene.

21. The cable of claim 19, wherein the polyethylene is medium density polyethylene.

22. The cable of claim 18, wherein the skin coating is contained in the outer jacket and blooms to the surface of the outer jacket when the jacket is extruded.

23. The cable of claim 18, where the skin coating is applied over the outer jacket using a crosshead die.

24. The cable of claim 18, further comprising strength members that are embedded within the outer jacket.

25. The cable of claim 18, wherein the outer jacket has a skin coating with a thickness of at least 0.001 inches.

26. A fiber optic cable comprising:

an outer jacket for the cable, wherein the jacket includes
   a resin selected from the group consisting of: polyethylenes, ethylene-vinyl acetate copolymers, ethylene/propylene rubbers, ethylene-ethyl acrylate copolymers or impact-modified isotactic polypropylene, including copolymers of polypropylene and ethylene/propylene rubbers;
   fillers; and
   a coupling agent to aid adhesion between the fillers and the resin and to aid dispersion of the fillers.

27. The cable of claim 26, further comprising a skin coating of polyethylene surrounding the outer jacket.

28. The cable of claim 26, wherein the fillers are fibrous fillers with an aspect ratio of at least 10:1.

29. The cable of claim 26, wherein the fillers are plate-like.

* * * * *